UNITED STATES PATENT OFFICE.

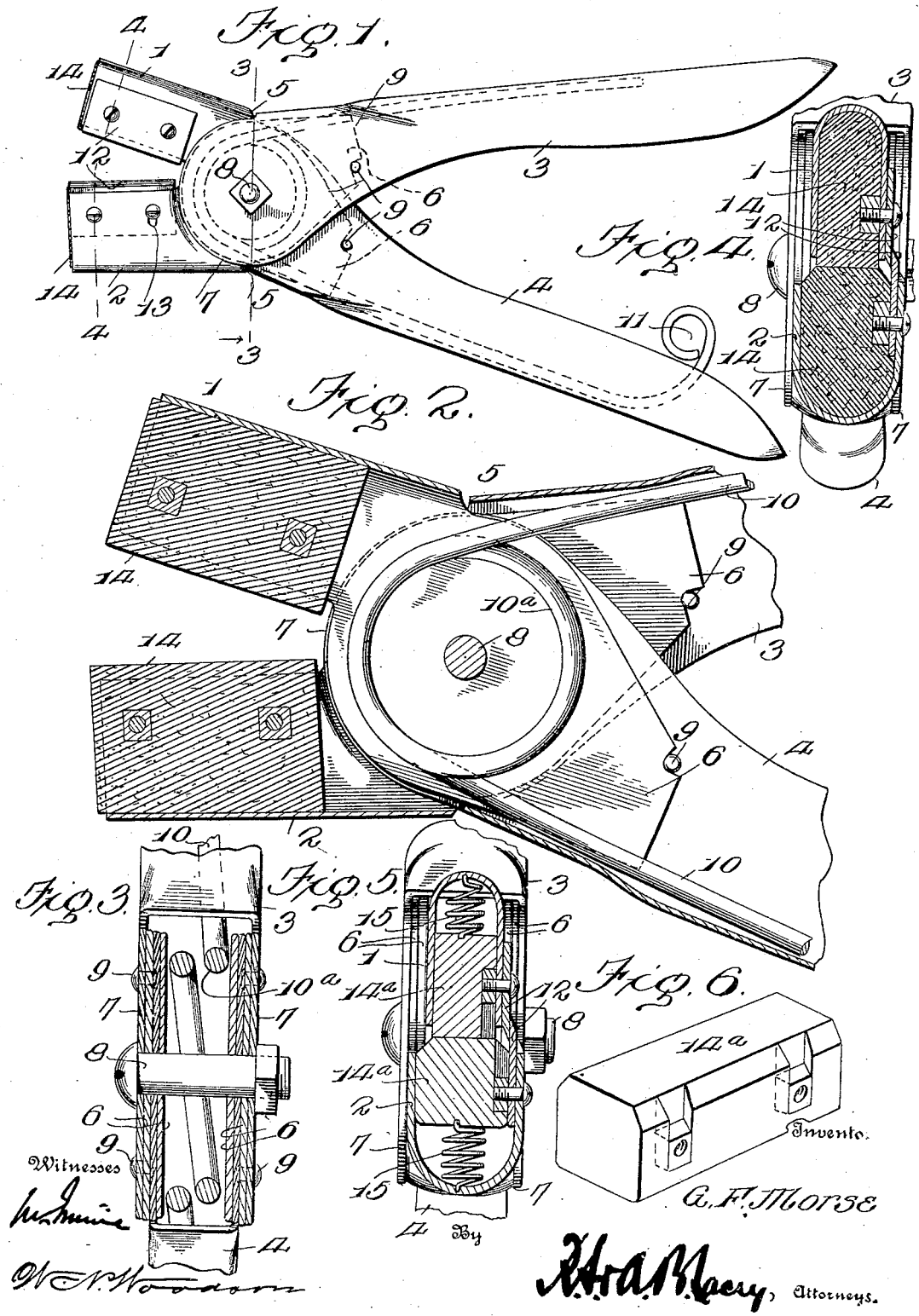

GEORGE F. MORSE, OF PERU, NEW YORK.

DEVICE FOR USE IN PICKING GRAPES.

936,146.  Specification of Letters Patent.  Patented Oct. 5, 1909.

Application filed February 3, 1909. Serial No. 475,827.

*To all whom it may concern:*

Be it known that I, GEORGE F. MORSE, citizen of the United States, residing at Peru, in the county of Clinton and State of New York, have invented certain new and useful Improvements in Devices for Use in Picking Grapes, of which the following is a specification.

The object of this invention is an improved construction of device for picking grapes, whereby the grapes do not come in contact with the picker's hands in the picking operation, the device being in the nature of a pair of nippers of novel and advantageous construction, as will be hereinafter fully described and claimed.

For a full understanding of the invention and the merits thereof, and to acquire a knowledge of the details of construction, reference is to be had to the following description and accompanying drawing, in which:

Figure 1 is a side elevation of a tool embodying the improvements of my invention; Fig. 2 is an enlarged longitudinal sectional view of a portion thereof; Fig. 3 is a transverse section on the line 3—3 of Fig. 1; Fig. 4 is a similar view on the line 4—4 of Fig. 1; Fig. 5 is a transverse sectional view illustrating a modification hereinafter specifically described; and, Fig. 6 is a detail perspective view of one of the gripping blocks of such modification.

Corresponding and like parts are referred to in the following description and indicated in all the views of the drawing, by the same reference characters.

My improved grape-picking device comprises jaws 1 and 2 and handles 3 and 4. The jaws are preferably constructed of strips of metal that are bent upon themselves transversely to a U shape in cross section, the said strips being recessed, as at 5, to form rearwardly extending ends 6 that are spaced from each other, as shown. The handles 3 and 4 are also preferably constructed of strips of metal doubled upon themselves to produce channeled portions with disk-like heads 7, these heads overlapping each other and also overlapping the rearwardly extending ends 6 of the jaws, a pivot bolt 8 being inserted through the heads 7 and the rearwardly extending ends of the jaws to pivotally connect the parts together. The ends 6 of the jaws are also held in place by means of pins 9 which extend transversely through the side portions of the channeled handles 3 and 4. If desired, these pins may be extended through the ends 6 of the jaws, but preferably, as illustrated in the drawing, the ends are interposed between the pins and the adjacent outer sides of the handles, so that while the jaws are securely held in place, they may be easily detached by merely withdrawing the pivot bolt 8. In order to press the jaws open, a spring 10 is coiled around the pivot bolt 8, as at 10$^a$, being thereby incased within the disk-like heads 7 of the handles and the rearwardly extending ends 6 of the jaws, the ends of the spring extending longitudinally within the channels of the handles. If desired, one end of the spring may be coiled to form a ring 11 to allow the tool to be held by one finger, or enable it to be hung upon a nail or other support, when not in use.

12 designates blades that are secured to the respective handles 3 and 4 by screws or small screw bolts. Preferably, one of the jaws is formed with a slot 13 to receive one of the fastening devices for this blade, so that the blade may be adjusted to different inclinations, as desired.

14 designates yielding grippers. These may be in the form of cushion blocks of rubber or similar compressible substance received within the U-shaped jaws 3 and 4 and held therein in any desired way, the opposing portions of the blocks or grippers normally projecting beyond the inner margin of the jaws, but preferably terminating flush with or somewhat short of the cutting edges of the blades 12. If desired, as illustrated in Fig. 5, the yieldable grippers may be in the form of blocks 14$^a$ of metal or wood or any other desired substance, with springs 15 back of them to permit them to yield.

From the foregoing description, in connection with the accompanying drawing, it is believed that the operation of my improved grape-picking device is obvious. By grasping the handles 3 and 4 and pressing the same together, the jaws 1 and 2 may be closed upon the stem of a bunch of grapes, the blades snipping the same, while at the same time, or immediately following the cutting operation, the yielding grippers will securely grip the bunch and prevent it from falling, after which it may be deposited in a basket or similar receptacle, without coming in contact with the picker's hands.

It is obvious that by removing the grippers 14 and 14ª, the device may be used as a pruning implement.

Having thus described the invention, what I claim is:

A device of the character described, comprising pivoted jaws and handles, the jaws being constructed of strips doubled transversely upon themselves and recessed to produce rearwardly extended ends which are spaced laterally from each other, the handles being also formed of strips doubled upon themselves transversely to produce channeled portions, the handles being formed with disk-like heads extending forwardly from such channeled portions and overlapping each other and the rearwardly extended ends of the jaws, the pivot extending through the heads and the rearwardly extended ends of the jaws and such rearwardly extended ends being received in and engaged by the channeled portions of the handles, whereby a movement of the handles toward each other will impart a closing movement to the jaws, pins secured to the handles and engaging the rearwardly extended ends of the jaws, an expansion spring coiled within the heads and having its arms extended along the channeled portion of the handles; yieldable grippers mounted in the jaws, and blades secured to said jaws.

In testimony whereof I affix my signature in presence of two witnesses.

GEORGE F. MORSE. [L. S.]

Witnesses:
CHARLES V. REED,
GEORGE CAULL.